(12) United States Patent
Fan et al.

(10) Patent No.: US 11,112,630 B2
(45) Date of Patent: Sep. 7, 2021

(54) DISPLAY PANEL PROTECTIVE GLASS AND PREPARATION METHOD THEREOF, DISPLAY PANEL AND DISPLAY DEVICE

(71) Applicants: BOE Technology Group Co., Ltd., Beijing (CN); Hefei Xinsheng Optoelectronics Technology Co., Ltd., Anhui (CN)

(72) Inventors: Wenjin Fan, Beijing (CN); Baoran Li, Beijing (CN); Bisheng Li, Beijing (CN); Lei Zhang, Beijing (CN); Shengnan Wang, Beijing (CN); Jing Huang, Beijing (CN); Wei Zhang, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 708 days.

(21) Appl. No.: 15/775,662

(22) PCT Filed: Oct. 9, 2017

(86) PCT No.: PCT/CN2017/105319
§ 371 (c)(1),
(2) Date: May 11, 2018

(87) PCT Pub. No.: WO2018/176786
PCT Pub. Date: Oct. 4, 2018

(65) Prior Publication Data
US 2020/0292868 A1 Sep. 17, 2020

(30) Foreign Application Priority Data
Mar. 27, 2017 (CN) .......................... 201710188500.6

(51) Int. Cl.
*B32B 3/00* (2006.01)
*G02F 1/1333* (2006.01)
*G02F 1/1335* (2006.01)

(52) U.S. Cl.
CPC .... *G02F 1/133308* (2013.01); *G02F 1/13338* (2013.01); *G02F 1/133512* (2013.01); *G02F 1/133331* (2021.01)

(58) Field of Classification Search
CPC ....................... G02F 1/133308; G02F 1/13338
See application file for complete search history.

(56) References Cited

U.S. PATENT DOCUMENTS

2011/0024078 A1   2/2011  Tong et al.
2014/0153100 A1*  6/2014  Yi .......................... G02B 5/223
                                                              359/609

(Continued)

FOREIGN PATENT DOCUMENTS

CN      102257548 A    11/2011
CN      203573060 U     4/2014

(Continued)

OTHER PUBLICATIONS

English translation of ISR for PCT/CN2017/105319 mailed Jan. 19, 2018.

*Primary Examiner* — Elizabeth E Mulvaney
(74) *Attorney, Agent, or Firm* — Arent Fox LLP; Michael Fainberg

(57) ABSTRACT

The embodiments of the disclosure provide a display panel protective glass and a preparation method thereof, a display panel and a display device. The display panel protective glass comprises: a glass substrate; a white photoresist layer on the glass substrate, the white photoresist layer being arranged along a bezel region of the glass substrate; an isolation layer on the white photoresist layer; a black matrix (Continued)

layer on the isolation layer, the black matrix layer being arranged along the bezel region of the glass substrate.

11 Claims, 3 Drawing Sheets

(56) References Cited

U.S. PATENT DOCUMENTS

| | | | |
|---|---|---|---|
| 2014/0158298 A1* | 6/2014 | Hecht | B32B 37/02 156/314 |
| 2015/0077946 A1 | 3/2015 | Wu et al. | |
| 2017/0285820 A1 | 10/2017 | Li et al. | |
| 2017/0300142 A1* | 10/2017 | Zeng | G02B 6/005 |
| 2018/0143707 A1* | 5/2018 | Shi | G06F 3/0412 |
| 2018/0198089 A1* | 7/2018 | Kim | H01L 51/5246 |

FOREIGN PATENT DOCUMENTS

| | | | |
|---|---|---|---|
| CN | 104656997 A | 5/2015 | |
| CN | 104765505 A | 7/2015 | |
| CN | 106935143 A | 7/2017 | |

\* cited by examiner

DISPLAY PANEL PROTECTIVE GLASS AND PREPARATION METHOD THEREOF, DISPLAY PANEL AND DISPLAY DEVICE

The present application is a National Stage of International Application No. PCT/CN2017/105319, filed Oct. 9, 2017, which claims the priority from Chinese Patent Application No. 201710188500.6, filed with the Chinese Patent Office on Mar. 27, 2017 and entitled "DISPLAY PANEL PROTECTIVE GLASS AND PREPARATION METHOD THEREOF, DISPLAY PANEL AND DISPLAY DEVICE", which are hereby incorporated by reference in their entireties.

FIELD

The embodiments of the disclosure relates to the field of display technologies and particularly to a display panel protective glass and a preparation method thereof, a display panel and a display device.

BACKGROUND

At present, the capacitive touch screen has become the very common electronic product, while the OGS (One Glass Solution) is a kind of mainstream product. Due to the personal pursuit of the customers, the traditional OGS product with the black bezel cannot meet the mass consumption demand now, and the OGS product with the white bezel developed by some touch screen manufacturers has moved from the testing stage towards the small batch production stage gradually.

BRIEF SUMMARY

At least one embodiment of the disclosure provides a liquid crystal display device, which includes: a glass substrate; a white photoresist layer on the glass substrate, the white photoresist layer being arranged along a bezel region of the glass substrate; an isolation layer on the white photoresist layer, a black matrix layer on the isolation layer, the black matrix layer being arranged along the bezel region of the glass substrate.

In an embodiment of the disclosure, the isolation layer includes an inorganic insulation layer and/or an organic layer.

In an embodiment of the disclosure, the isolation layer includes a silicon dioxide film layer.

In an embodiment of the disclosure, the isolation layer is a whole layer structure covering the whole glass substrate.

In an embodiment of the disclosure, the isolation layer is arranged along the bezel region of the glass substrate, and a projection of the isolation layer on the glass substrate covers projections of the white photoresist layer and the black matrix layer on the glass substrate.

In an embodiment of the disclosure, the display panel protective glass further includes a touch structure on the glass substrate.

At least one embodiment of the disclosure provides a display panel which includes the display panel protective glass described in any one of the above-mentioned technical solutions.

At least one embodiment of the disclosure provides a display device which includes the display panel described in any one of the above-mentioned technical solutions.

At least one embodiment of the disclosure provides a preparation method of a display panel protective glass, which includes: forming a white photoresist film layer on a glass substrate; forming an isolation layer on the white photoresist film layer; forming a black matrix film layer on the isolation layer; arranging the white photoresist film layer and the black matrix film layer along a bezel region of the glass substrate through at least one patterning process, to form a white photoresist layer pattern and a black matrix layer pattern respectively.

In an embodiment of the disclosure, the isolation layer includes an inorganic insulation layer and/or an organic layer.

In an embodiment of the disclosure, the isolation layer includes a silicon dioxide film layer.

In an embodiment of the disclosure, the preparation method specifically includes following steps: forming a white photoresist film layer on a glass substrate, and forming a white photoresist layer pattern by using a first patterning process; forming an isolation layer on the white photoresist layer; forming a black matrix film layer on the isolation layer, and forming a black matrix layer pattern by using a second patterning process.

In an embodiment of the disclosure, the preparation method specifically includes the following steps: forming a white photoresist film layer on a glass substrate; forming an isolation layer on the white photoresist film layer; forming a black matrix film layer on the isolation layer; simultaneously forming a white photoresist layer pattern, an isolation layer pattern and a black matrix layer pattern by using a single mask patterning process, the white photoresist layer, the isolation layer and the black matrix layer being arranged along a bezel region of the glass substrate.

In an embodiment of the disclosure, after forming the black matrix layer pattern by using the patterning process, the preparation method further includes: forming a touch structure on the glass substrate.

BRIEF DESCRIPTION OF THE DRAWINGS

In order to illustrate the embodiments of the disclosure or the technical solutions in the related technology more clearly, the accompanying figures which need to be used in describing the embodiments or related technology will be introduced below briefly. Obviously the accompanying figures described below are some embodiments of the disclosure, and other accompanying figures can also be obtained by those ordinary skilled in the art according to these accompanying figures without creative work.

DETAILED DESCRIPTION OF THE EMBODIMENTS

In order to make the purposes, technical solutions and advantages of the disclosure clearer, the technical solutions in the embodiments of the disclosure will be described clearly and completely below in combination with the accompanying drawings in the embodiments of the disclosure. Obviously the described embodiments are a part of the embodiments of the disclosure but not all the embodiments. Based upon the embodiments in the disclosure, all of other embodiments obtained by those ordinary skilled in the art without creative work pertain to the protection scope of the disclosure.

Since the light shielding characteristic of the white photoresist material is poor, the bezel of the existing OGS product with the white frame generally includes a white photoresist layer and a black matrix layer, so as to prevent the metal wires within the bezel from appearing; however, with regard to such OGS product, the white color of the bezel region is often not pure enough, the color shift is serious, and the visual experience effect of the user is poor.

Figure 1:
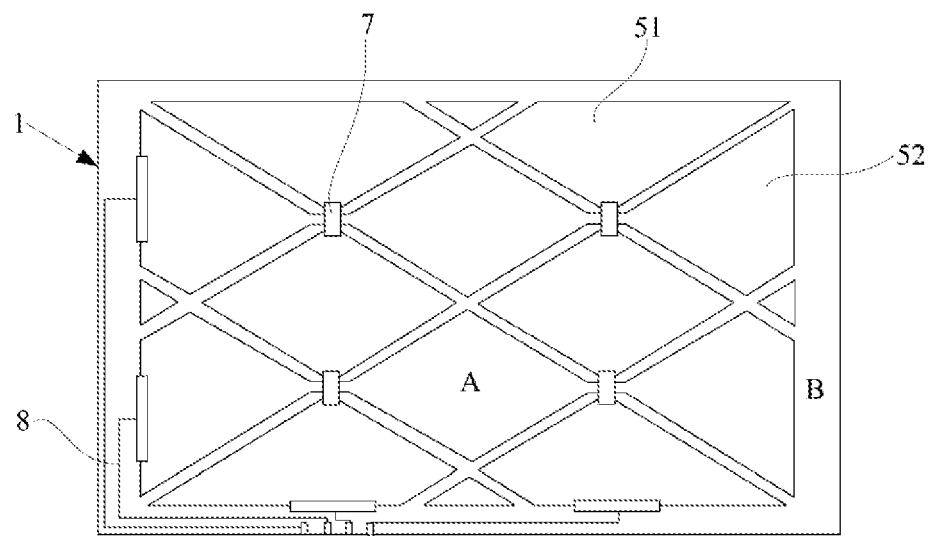
FIG. 1 is a structural schematic diagram of a display panel protective glass provided by an embodiment of the disclosure.
Figure 2:
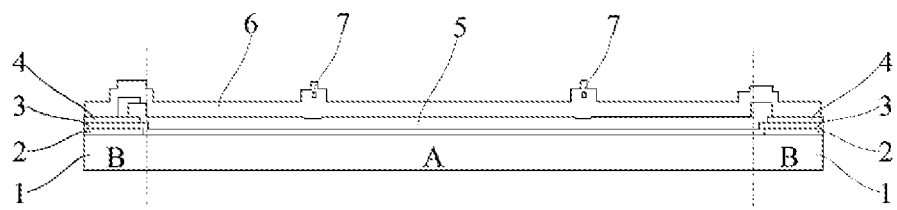
FIG. 2 is a structural schematic diagram of a section of a display panel protective glass provided by an embodiment of the disclosure.
Figure 3:
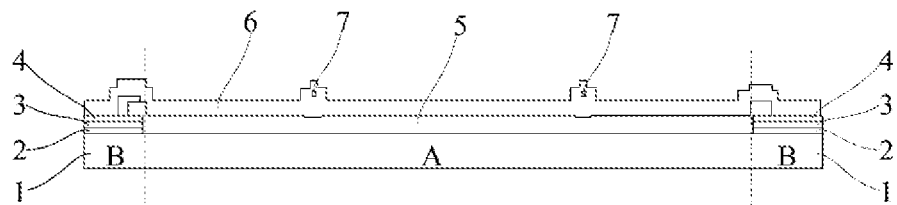
FIG. 3 is a structural schematic diagram of a section of a display panel protective glass provided by another embodiment of the disclosure.

As shown in FIGS. 1 to 3, a display panel protective glass provided by an embodiment of the disclosure includes: a glass substrate 1, which includes a display region A and a bezel region B surrounding the display region A; a white photoresist layer 2 on the glass substrate 1, the white photoresist layer 2 being arranged along the bezel region B of the glass substrate 1; an isolation layer 3 on the white photoresist layer 2; a black matrix layer 4 on the isolation layer 3, the black matrix layer 4 being arranged along the bezel region B of the glass substrate 1.

In the display panel protective glass described above, the white photoresist layer 2 and the black matrix layer 4 are arranged successively on the bezel region B of the glass substrate 1, so the display panel protective glass can be shown with the white bezel and a better bezel shading effect; also, since the isolation layer 3 is arranged between the white photoresist layer 2 and the black matrix layer 4, the osmosis and color interference influence of the black matrix layer 4 on the white photoresist layer 2 can be avoided, and thus the white bezel of the display panel protective glass described above has the pure color, higher color purity, smaller color shift, and better user experience.

As shown in FIGS. 2 and 3, in a specific embodiment, the isolation layer 3 can be an inorganic insulation layer such as silicon oxide or silicon nitride or the like, or can be an organic film layer such as resin, ultraviolet curable adhesive (UV adhesive), silicon gel, acrylic adhesive or various polyterephthalic acid plastics (PET) or the like, or can be a multilayer structure including both the inorganic film layer and the organic film layer.

As shown in FIG. 1, metal wires 8 are generally arranged in the bezel region B of the display panel protective glass, so the isolation layer 3 selects the various materials described above, which will not cause the electrostatic induction or signal interference or others.

As shown in FIGS. 2 and 3, according to the above embodiments, in an optional embodiment, the isolation layer 3 can be a silicon dioxide film layer, the silicon dioxide film layer has better compactness and can form a better isolation effect.

According to all the above embodiments, as shown in FIG. 2, in an optional embodiment, the isolation layer 3 can be a whole layer structure covering the whole glass substrate 1. At this point, the isolation layer 3 can be formed only by the film plating process without lithography or other patterning processes, so the process step of preparing the isolation layer 3 is simpler; with such arrangement, there is a need to select the material with higher optical transmittance to prepare the isolation layer 3, so as to increase the optical transmittance of the display region A of the display panel protective glass.

As shown in FIG. 3, in another optional embodiment, the isolation layer 3 can be arranged along the bezel region B of the glass substrate 1; and optionally, the projection of the isolation layer 3 on the glass substrate 1 covers the projections of the white photoresist layer 2 and the black matrix layer 4 on the glass substrate 1, that is, the area of the isolation layer 3 is enough to isolate the white photoresist layer 2 from the black matrix layer 4 completely.

The isolation layer 3 is only arranged on the bezel region B of the glass substrate 1, which can not only avoid the osmosis interference influence of the black matrix layer 4 on the white photoresist layer 2 and thus increase the color purity of the white frame, but also not influence the transmittance of the display region A of the display panel protective glass. Also the material selecting demand for the isolation layer 3 is relatively loose.

As shown in FIGS. 2 and 3, according to all the above embodiments, in an optional embodiment, the display panel protective glass can further include a touch structure on the glass substrate 1, so that the display panel protective glass forms an OGS touch panel; and optionally, the touch structure can include touch electrodes 5 and an insulation layer 6 and the like, wherein the touch electrodes 5 can include transmitting electrodes 51 and receiving electrodes 52.

An embodiment of the disclosure further provides a display panel which includes the display panel protective glass in any one of the above embodiments.

An embodiment of the disclosure further provides a display device which includes the display panel in the above embodiments.

Since both of the above display panel and display device use the display panel protective glass in the embodiments of the disclosure, they have the white bezel, and the white color of the bezel has higher color purity and smaller color shift.

Based on the display panel protective glass in the above embodiments of the disclosure, an embodiment of the disclosure further provides a preparation method of a display panel protective glass, which includes: forming a white photoresist film layer on a glass substrate; forming an isolation layer on the white photoresist film layer; forming a black matrix film layer on the isolation layer, and arranging the white photoresist film layer and the black matrix film layer along a bezel region of the glass substrate through at least one patterning process, to form a white photoresist layer pattern and a black matrix layer pattern respectively.

Figure 4:
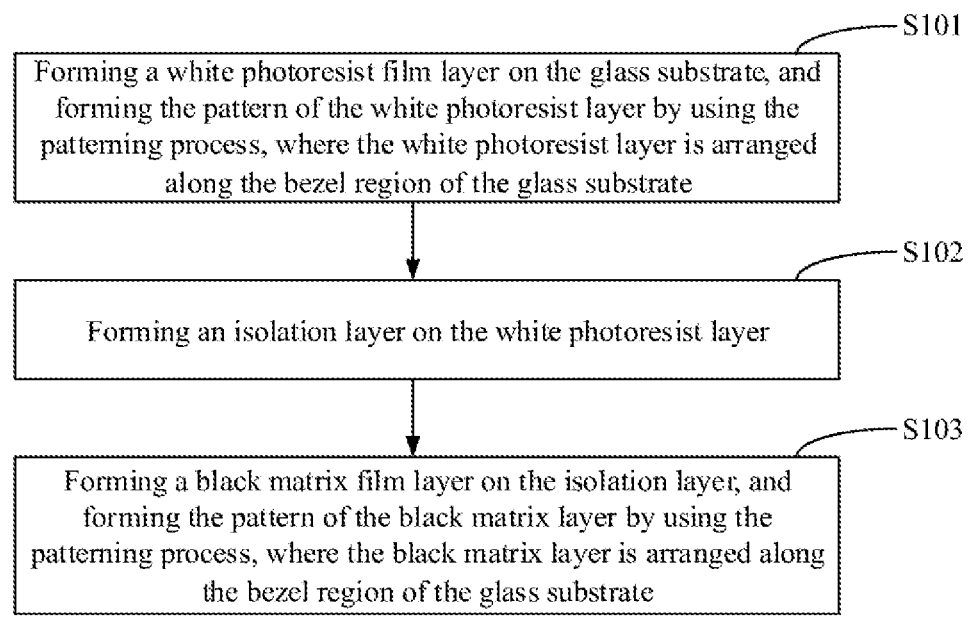
FIG. 4 is a flow chart of a preparation method of a display panel protective glass provided by an embodiment of the disclosure.

As shown in FIGS. 2 and 4, in an optional embodiment of the disclosure, the preparation method of the display panel protective glass can optionally include the following steps.

Step S101: forming a white photoresist film layer on the glass substrate 1, and forming the pattern of the white photoresist layer 2 by using the patterning process, where the white photoresist layer 2 is arranged along the bezel region B of the glass substrate 1.

Step S102: forming an isolation layer 3 on the white photoresist layer 2.

Step S103: forming a black matrix film layer on the isolation layer 3, and forming the pattern of the black matrix layer 4 by using the patterning process, where the black matrix layer 4 is arranged along the bezel region B of the glass substrate 1.

Figure 5:
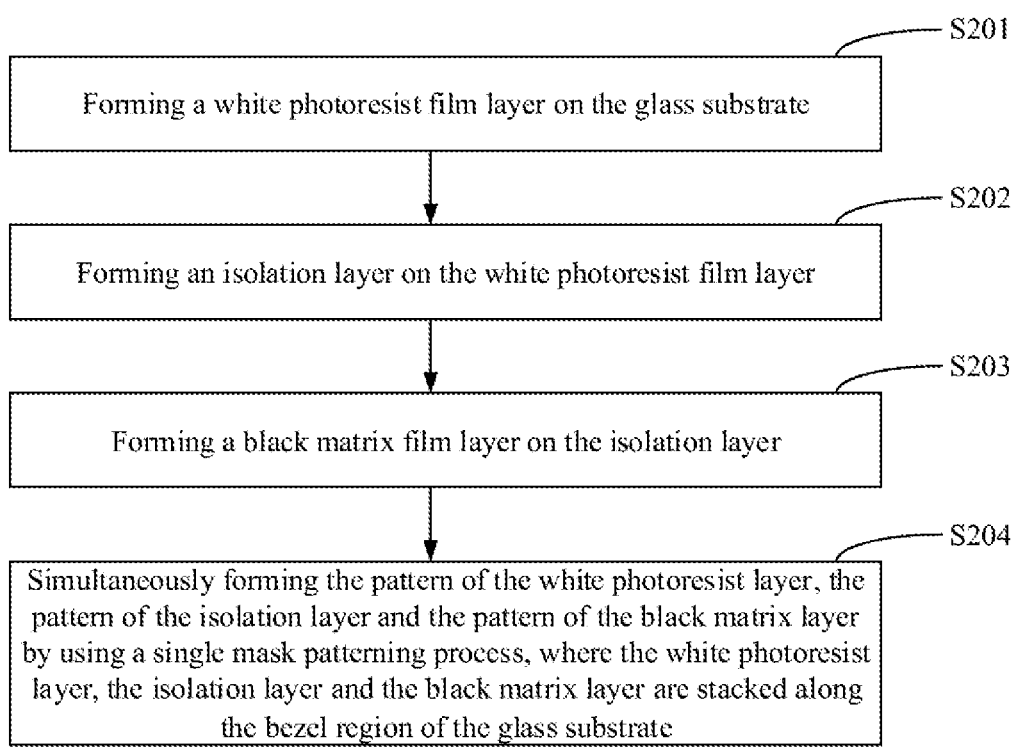
FIG. 5 is a flow chart of a preparation method of a display panel protective glass provided by another embodiment of the disclosure.

As shown in FIGS. 3 and 5, in another optional embodiment of the disclosure, the preparation method of the display panel protective glass can optionally include the following steps.

Step S201: forming a white photoresist film layer on the glass substrate 1.

Step S202: forming an isolation layer on the white photoresist film layer.

Step S203: forming a black matrix film layer on the isolation layer.

Step S204: simultaneously forming the pattern of the white photoresist layer 2, the pattern of the isolation layer 3 and the pattern of the black matrix layer 4 by using a single mask patterning process, where the white photoresist layer 2, the isolation layer 3 and the black matrix layer 4 are stacked along the bezel region B of the glass substrate 1.

In the embodiments as shown in FIGS. 3 and 5, only a single mask patterning process is used, which can reduce the number of the patterning processes, increase the production efficiency and lower the cost.

As shown in FIGS. 2 and 3, according to two above embodiments, in an optional embodiment, the isolation layer 3 can be an inorganic insulation layer such as silicon oxide or silicon nitride or the like, or can be an organic film layer such as rubber, resin or UV adhesive or the like, or can be a multilayer structure including both the inorganic film layer and the organic film layer. As shown in FIG. 1, metal wires 8 are generally arranged in the bezel region B of the display panel protective glass, so the isolation layer 3 selects the various materials described above, which will not cause the electrostatic induction or signal interference or others.

As shown in FIGS. 2 and 3, according to the above embodiments, in an optional embodiment, the isolation layer 3 can be a silicon dioxide film layer. The silicon dioxide film layer has better compactness and can form a better isolation effect.

According to the above embodiments, in an optional embodiment, forming the isolation layer on the white photoresist layer can optionally include: forming the silicon dioxide film layer on the white photoresist layer 2 by using the sputter coating process.

Further, the processing method in FIG. 4 can be used, that is, the above silicon dioxide film layer can be directly used as the isolation layer 3, and at this point, the structure of the display panel protective glass is as shown in FIG. 2; the processing method in FIG. 5 can also be used, that is, the above silicon dioxide film layer is further patterned by using the patterning process, to ultimately form the isolation layer 3 arranged along the bezel region B of the glass substrate 1, and at this point, the structure of the display panel protective glass is as shown in FIG. 3. Optionally, the projection of the isolation layer 3 on the glass substrate 1 covers the projections of the white photoresist layer 2 and the black matrix layer 4 on the glass substrate 1, that is, the area of the isolation layer 3 is enough to isolate the white photoresist layer 2 from the black matrix layer 4 completely.

According to all the above embodiments, in an optional embodiment, after forming the white photoresist layer pattern and the black matrix layer pattern through at least one patterning process, i.e., after forming the white photoresist layer 2 and the black matrix layer 4 arranged along the bezel region B of the glass substrate 1, the preparation method can further include the following step: forming a touch structure on the glass substrate 1, as shown in FIGS. 2 and 3.

Optionally, forming the touch structure on the glass substrate 1 can include the following steps.

Forming an ITO layer on the glass substrate 1, and forming the pattern of the touch electrodes 5 including the transmitting electrodes 51 and receiving electrodes 52 by using the patterning process, as shown in FIGS. 1 to 3.

Forming a first insulation layer on the touch electrodes 5, and forming the pattern of the first insulation layer by using the patterning process.

Forming a metal layer on the first insulation layer, and forming the pattern of the metal bridge 7 by using the patterning process, as shown in FIGS. 1 to 3.

Forming a second insulation layer on the metal bridge 7, and forming the pattern of the second insulation layer by using the patterning process.

It is necessary to note that the insulation layer 6 labeled in FIGS. 2 and 3 includes the first insulation layer and the second insulation layer formed successively, and has the structure with two insulation layers.

Moreover, the above touch structure is just an optional embodiment of the disclosure, and the touch structure in the display panel protective glass of the disclosure is not limited to the touch structure in the above embodiments.

Finally it should be noted that the above embodiments are only used to illustrate but not limit the technical solutions of the disclosure; although the disclosure has been illustrated in details by reference to the above embodiments, it should be understood by those ordinary skilled in the art that they can still modify the technical solutions recorded in all the above embodiments or equivalently replace some technical features therein; and these modifications and replacements do not make the essence of the corresponding technical solutions depart from the spirit and scope of the technical solutions of all the embodiments of the disclosure.

What is claimed is:

1. A display panel protective glass, comprising:
    a glass substrate;
    a white photoresist layer on the glass substrate, the white photoresist layer being arranged along a bezel region of the glass substrate;
    an isolation layer on the white photoresist layer;
    a black matrix layer on the isolation layer, the black matrix layer being arranged along the bezel region of the glass substrate;
    wherein the isolation layer is a whole layer structure covering a whole of the glass substrate.

2. The display panel protective glass according to claim 1, wherein the isolation layer comprises at least one of an inorganic insulation layer and an organic layer.

3. The display panel protective glass according to claim 1, wherein the isolation layer comprises a silicon dioxide film layer.

4. The display panel protective glass according to claim 1, further comprising a touch structure on the glass substrate.

5. A display panel, comprising the display panel protective glass according to claim 1.

6. A display device, comprising the display panel according to claim 5.

7. A method for preparing the display panel protective glass of claim 1, comprising:
    forming the white photoresist film layer on the glass substrate;
    forming the isolation layer on the white photoresist film layer;
    forming the black matrix film layer on the isolation layer;
    arranging the white photoresist film layer and the black matrix film layer along a bezel region of the glass substrate through at least one patterning process, to form a white photoresist layer pattern and a black matrix layer pattern respectively.

8. The method according to claim 7, wherein the isolation layer comprises at least one of an inorganic insulation layer and an organic layer.

9. The method according to claim 7, wherein the isolation layer comprises a silicon dioxide film layer.

10. The method according to claim 7, wherein arranging the white photoresist film layer and the black matrix film layer along a bezel region of the glass substrate through at least one patterning process, to form a white photoresist layer pattern and a black matrix layer pattern respectively, comprises:

forming a white photoresist layer pattern by using a first patterning process after forming the white photoresist film layer on glass substrate and before forming the isolation layer on the white photoresist layer;

forming a black matrix layer pattern by using a second patterning process after forming the black matrix film layer on the isolation layer.

11. The method according to claim 7, wherein after forming the black matrix layer pattern by using the patterning process, the method further comprises:

forming a touch structure on the glass substrate.

* * * * *